US007987218B2

(12) United States Patent
Koepke et al.

(10) Patent No.: US 7,987,218 B2
(45) Date of Patent: Jul. 26, 2011

(54) METHOD AND SYSTEM FOR ESTABLISHING A SPATIAL STREET ADDRESS DATA SET

(75) Inventors: Michael Arthur Koepke, Geneva, IL (US); Aaron Daniel Miller, Frederick, CO (US)

(73) Assignee: West Corporation, Omaha, NE (US)

( * ) Notice: Subject to any disclaimer, the term of this patent is extended or adjusted under 35 U.S.C. 154(b) by 538 days.

(21) Appl. No.: 12/115,203

(22) Filed: May 5, 2008

(65) Prior Publication Data

US 2009/0276450 A1 Nov. 5, 2009

(51) Int. Cl.
*G06F 17/30* (2006.01)
(52) U.S. Cl. ........ 707/921; 707/912; 707/918; 707/919; 707/920; 701/200; 701/206; 701/208
(58) Field of Classification Search ................. 707/752, 707/912, 918–921; 701/200, 206, 208
See application file for complete search history.

(56) References Cited

U.S. PATENT DOCUMENTS

| | | | |
|---|---|---|---|
| 5,214,757 A | 5/1993 | Mauney et al. | |
| 5,873,040 A | 2/1999 | Dunn et al. | |
| 6,101,496 A * | 8/2000 | Esposito | 1/1 |
| 6,185,565 B1 | 2/2001 | Meubus et al. | |
| 6,233,523 B1 | 5/2001 | Sood | |
| 6,408,307 B1 | 6/2002 | Semple et al. | |
| 6,496,835 B2 | 12/2002 | Liu et al. | |
| 6,529,722 B1 | 3/2003 | Heinrich et al. | |
| 6,600,812 B1 | 7/2003 | Gentillin | |
| 6,658,356 B2 * | 12/2003 | Chen et al. | 702/5 |
| 6,819,929 B2 | 11/2004 | Antonucci et al. | |
| 6,873,998 B1 | 3/2005 | Dorum et al. | |
| 6,934,634 B1 * | 8/2005 | Ge | 702/2 |
| 7,113,775 B2 | 9/2006 | Punjabi | |
| 7,136,474 B2 | 11/2006 | Shaffer et al. | |
| 7,376,636 B1 * | 5/2008 | Wang et al. | 707/694 |
| 7,668,651 B2 * | 2/2010 | Searight et al. | 701/208 |
| 2001/0005678 A1 | 6/2001 | Lee | |
| 2001/0021646 A1 | 9/2001 | Antonucci et al. | |
| 2002/0029226 A1 | 3/2002 | Li et al. | |
| 2002/0184064 A1 | 12/2002 | Schnurmann et al. | |
| 2003/0158661 A1 * | 8/2003 | Chen et al. | 701/210 |
| 2003/0158667 A1 * | 8/2003 | Chen et al. | 702/5 |
| 2004/0139049 A1 | 7/2004 | Hancock et al. | |

(Continued)

OTHER PUBLICATIONS

Address Standards Working Group, Street Address Data Standard, Nov. 2005, Federal Geographic Data Committee, Working Draft 2.0 <http://www.fgdc.gov/standards/projects/FGDC-standards-projects/street-address/05-11.2ndDraft.CompleteDoc.pdf>, p. 1-9.*

*Primary Examiner* — Frantz Coby (57) ABSTRACT

A method for establishing a spatial street address data set including: First, in no particular order: (1) providing street address data; (2) providing postal data; (3) providing community translation data; and (4) providing a spatial layer base map. Second, establishing a first data base containing once-translated address entries, each relating to a selected community entry from the street address data or a selected community entry from the community translation data. Third, establishing a second data base containing twice-translated address entries, each relating to a selected street name entry from the postal data or a selected street name entry from the street address data. Fourth, treating the second data base with a geocoder routine to create geocoded address entries in a geocoded data set. Fifth, situating the geocoded data set in a spatial layer. Sixth, orienting the spatial layer with known loci in the spatial layer base map.

20 Claims, 4 Drawing Sheets

U.S. PATENT DOCUMENTS

| | | |
|---|---|---|
| 2004/0172418 A1 | 9/2004 | Dorum et al. |
| 2005/0090225 A1 | 4/2005 | Muehleisen et al. |
| 2005/0283503 A1 | 12/2005 | Hancock et al. |
| 2006/0068753 A1 | 3/2006 | Karpen et al. |
| 2006/0074978 A1 | 4/2006 | Biasi et al. |
| 2006/0233317 A1 | 10/2006 | Coster et al. |
| 2006/0242199 A1 | 10/2006 | Cobleigh et al. |
| 2007/0260628 A1* | 11/2007 | Fuchs et al. .................. 707/101 |
| 2008/0140311 A1* | 6/2008 | Searight et al. ............... 701/208 |
| 2008/0263088 A1* | 10/2008 | Webster et al. ........... 707/103 R |
| 2010/0131196 A1* | 5/2010 | Searight et al. ............... 701/208 |

* cited by examiner

METHOD AND SYSTEM FOR ESTABLISHING A SPATIAL STREET ADDRESS DATA SET

FIELD OF THE INVENTION

The present invention is directed to data sets or data bases, and especially to spatial data sets or data bases relating to geographic data.

BACKGROUND OF THE INVENTION

Geographic data sets or data bases used for locating addresses such as, by way of example and not by way of limitation a MSAG (Master Street Address Guide) used for emergency services, are sometimes embodied in tabular or two-dimensional form. Users sometimes are required to use more than one data set or data base to ascertain information needed because not all information is available in one data base. Having to employ tabular information and having to consult more than one data set to obtain needed information can be sources of inaccuracies or delays in handling responses to inquiries such as, by way of example and not by way of limitation, emergency service calls.

Establishing a spatial street address data set for a given area, one may align reference loci of spatial street address data sets for adjacent areas and "sew together" multiple respective spatial street address data sets to create a wide area spatial street address data set. Numerous features may be defined in such spatial street address data sets and in such wide area spatial street address data sets such as, by way of example and not by way of limitation, alternate street names, areas of responsibility for one or more Public Safety Answering Point (PSAP; sometimes referred to as a Public Safety Answering Position) and other features.

There is a need for a method and system for establishing a spatial street address data set.

SUMMARY OF THE INVENTION

A method for establishing a spatial street address data set including: First, in no particular order: (1) providing street address data containing at least community entry and street name entry information; (2) providing postal data containing at least street name entry information; (3) providing community translation data containing at least community entry information; and (4) providing a spatial layer base map containing at least one spatial community entry. Second, employing selected information from the street address data set, the community translation data set and the spatial layer base map for establishing a first data base containing once-translated address entries, each once-translated address entry replacing a respective spatial community entry of the at least one spatial community entry and each relating to a selected community entry from the street address data or a selected community entry from the community translation data. Third, employing the first interim data base and selected information from the street address data set and the postal data set for establishing a second data base containing twice-translated address entries, each twice-translated address entry replacing a respective street name entry in the first interim data base and each relating to a selected street name entry from the postal data or a selected street name entry from the street address data. Fourth, treating the second data base with a geocoder routine to create geocoded address entries in a geocoded data set. Fifth, situating the geocoded data set in a spatial layer. Sixth, orienting the spatial layer with known loci in the spatial layer base map.

An apparatus for establishing a spatial street address data set; the apparatus including: First, at least one computer-readable storage media containing: (1) a street address data set containing at least community entry and street name entry information; (2) a postal data set containing at least street name entry information; (3) a community translation data set containing at least community entry information; and (4) a spatial layer base map containing at least one spatial community entry. Second, a first data treating unit coupled with the at least one computer-readable storage media; the first data treating unit employing selected information from the street address data set, the community translation data set and the spatial layer base map for establishing a first interim data base containing a plurality of once-translated address entries; each respective once-translated address entry of the plurality of once-translated address entries replacing a respective spatial community entry of the at least one spatial community entry; each respective once-translated address entry relating to a selected community entry from the street address data set or relating to a selected community entry from the community translation data set. Third, a second data treating unit coupled with the first interim data base and with the at least one computer-readable storage media; the second data treating unit treating selected data in the at least one computer-readable storage media and data in the first interim data base to effect populating the second interim data base with a plurality of twice-translated address entries; each respective twice-translated address entry of the plurality of twice-translated address entries replacing a respective street name entry in the first interim data base; each twice-translated address entry relating to a selected street name entry from the postal data set or relating to a selected street name entry from the street address data set. Fourth, a geocoding unit coupled with the second interim data base; the geocoding unit effecting geocoding treatment of entries in the second interim data base to populate a geocoded data set. Fifth, an orienting unit coupled with the geocoding unit; the orienting unit effecting orientation of entries in the geocoded data set with respect to known loci in the spatial layer base map to establish the spatial street address data set.

It is, therefore a feature of the present invention to provide a method and system for establishing a spatial street address date set.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as an E9-1-1 network. The teachings of the present invention are equally applicable, useful and novel in other calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
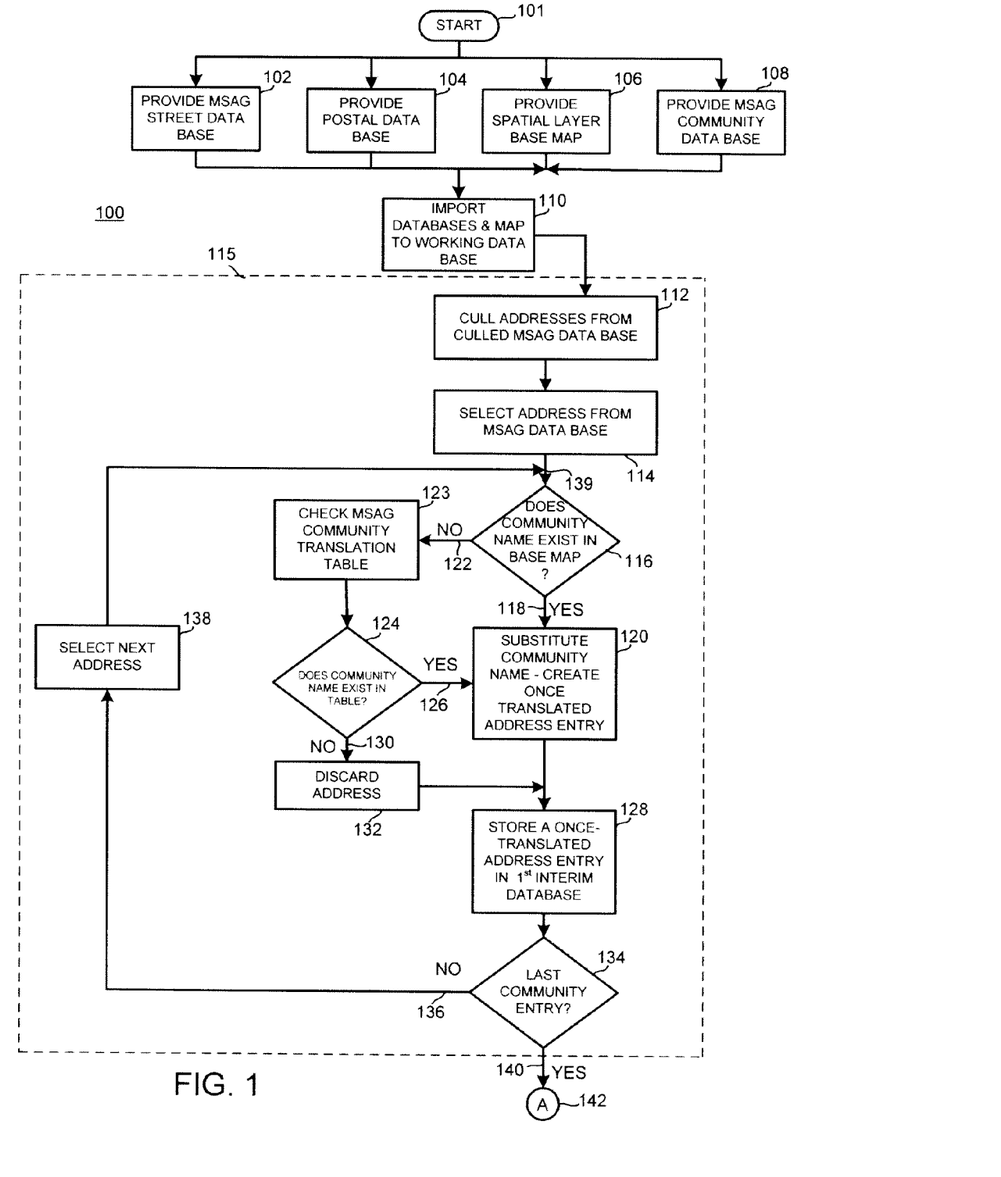
FIG. 1 is a schematic diagram of a first portion of a method for establishing a spatial street address data set.

FIG. 1 is a schematic diagram of a first portion of a method for establishing a spatial street address data set. In FIG. 1, a method for establishing a spatial street address data set begins at a START locus 101. Method 100 continues with, in no particular order: (1) providing a street address data set or data base, as indicated by a block 102; providing a postal data set or data base, as indicated by a block 104; providing a community translation data set or data base, as indicated by a block 108; and providing a spatial layer base map, as indicated by a block 106. The street address data set (block 102) may be embodied, by way of example and not by way of limitation, in a MSAG (Master Street Address Guide) used for emergency services. The postal data set (block 104) may be embodied, by way of example and not by way of limitation, in a U.S. Postal Service (USPS) data base. The community translation data set (block 108) may also be part of, by way of example and not by way of limitation, part of a MSAG used for emergency services.

Method 100 continues with importing the data bases (blocks 102, 104, 108) and map (block 106) to a working data base such as, by way of example and not by way of limitation, an Oracle® data base, as indicated by a block 110.

Method 100 continues with establishing a first interim data base, as indicated by a box 115. The first interim data base contains a plurality of once-translated address entries. Each respective once-translated address entry of the plurality of once-translated address entries relating to a selected community entry from the street address data set (block 102) or relating to a selected community entry from the community translation data set (block 108).

Method 100 begins establishment of a first interim data base by culling addresses information from the two-dimensional street address data set (block 102) to establish a culled address set, as indicated by a block 112. Method 100 continues with selecting a community entry from the culled address set, as indicated by a block 114.

Method 100 continues by inquiring whether the community entry is extant as a spatial community entry in the spatial layer base map (block 106), as indicated by a query block 116. If the community entry is extant as a spatial community entry in the spatial layer base map, method 100 proceeds from query block 116 via a YES response line 118 to substitute the spatial community entry for the community entry in the first interim data base and thereby create a once-translated address entry, as indicated by a block 120. If the community entry is not extant as a spatial community entry in the spatial layer base map, method 100 proceeds from query block 116 via a NO response line 122 and checks whether the community entry is extant as a translation community entry in the community translation data set (block 108), as indicated by a block 123. Method 100 inquires whether the community entry is extant as a translation community entry in the community translation data set, as indicated by a query block 124. If the community entry is extant as a translation community entry in the community translation data set, method 100 proceeds from query block 124 via a YES response line 126 and substitutes the translation community entry for the community entry in the first interim data base, thereby creating a once-translated address entry, as indicated by block 120. If the community entry is not extant as a translation community entry in the community translation data set, method 100 proceeds from query block 124 via a NO response line 130 and the extant community entry is discarded, as indicated by a block 132.

Method 100 continues with storing the spatial community entry or the translation community entry as a respective once-translated data entry in the first interim data base, as indicated by a block 128. Method 100 then inquires whether the just-treated community entry is the last community entry in the culled address set, as indicated by a query block 134. If the just-treated community entry is not the last community entry in the culled address set, method 100 proceeds from query block 134 via a NO response line 136 and selects a next community entry, as indicated by a block 138. Method 100 proceeds from block 138 to a locus 139 and proceeds from locus 139 to repeat steps described in connection with blocks 116, 120, 123, 124, 128, 132, 134 with regard to the next-selected community entry. If the just-treated community entry is the last community entry in the culled address set, method 100 proceeds from query block 134 via a YES response line 140 to a locus 142 and thence to FIG. 2.

Figure 2:
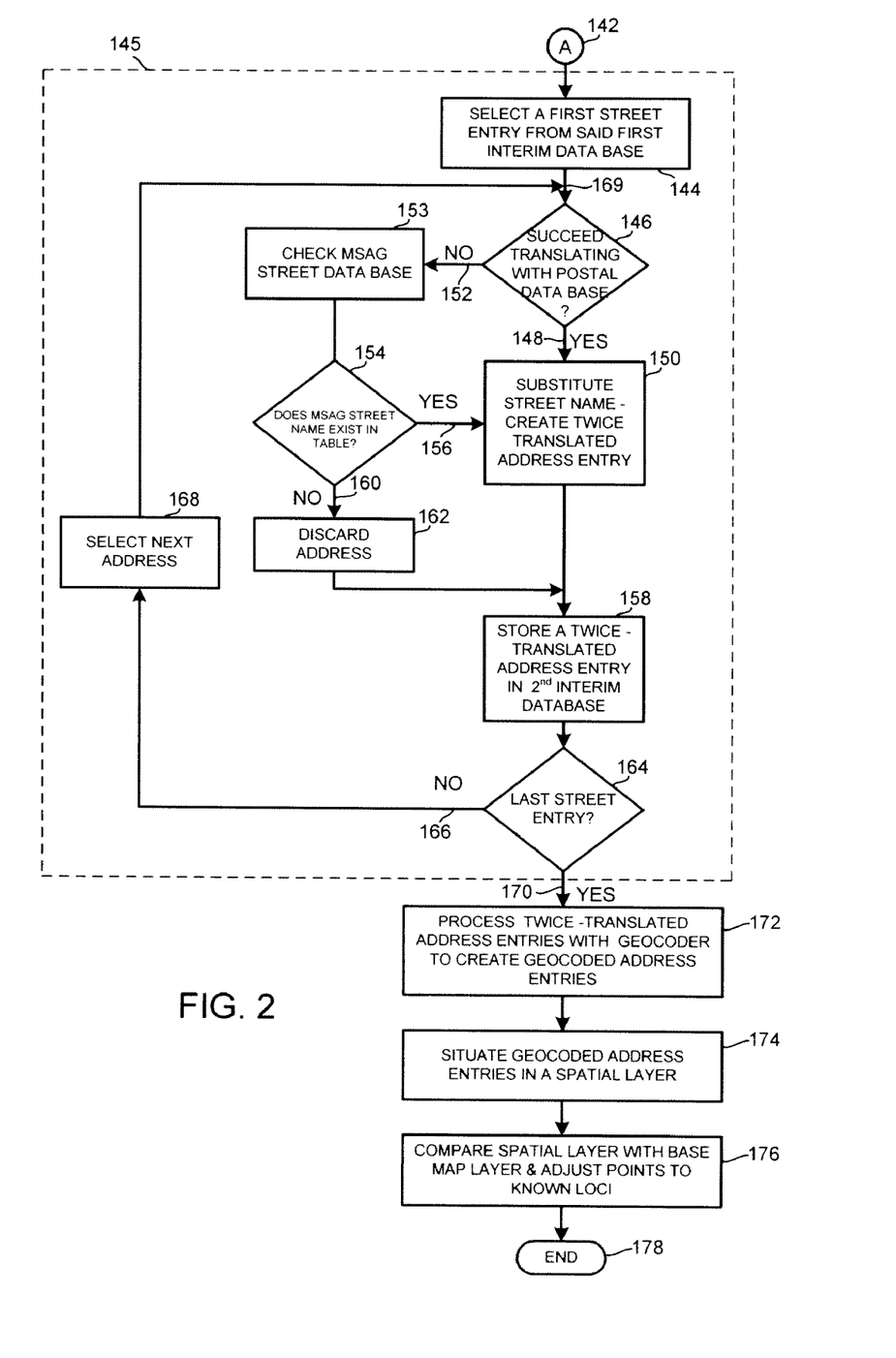
FIG. 2 is a schematic diagram of a second portion of the method for establishing a spatial street address data set begun in FIG. 1.

FIG. 2 is a schematic diagram of a second portion of the method for establishing a spatial street address data set begun in FIG. 1. In FIG. 2, method 100 continues from locus 142 to establish a second interim data base, as indicated by a box 145. The second interim data base contains a plurality of twice-translated address entries. Each respective twice-translated address entry of the plurality of twice-translated address entries relates to a selected street name entry from the postal data set or relates to a selected street name entry from the street address data set.

Method 100 continues from locus 142 with selecting a street entry from the first interim data base and inquiring whether the extant street entry can be translated using the postal data base (block 104), as indicated by a query block 146. If the translating is achieved, method 100 proceeds from query block 146 via a YES response line 148 and substitutes the postal street name for the extant street entry from the second interim data base, as indicated by a block 150. If the translating is not achieved, method 100 proceeds from query block 146 via a NO response line 152 and checks whether the street entry is extant as a street name entry in the street name data set (block 102), as indicated by a block 153. Method 100 inquires whether the street entry is extant as a listed street name in the street address data set (block 102), as indicated by a query block 154. If the street entry is extant as a street name entry in the street name data set, method 100 proceeds from query block 154 via a YES response line 156 and substitutes the listed street name in the street address data set for the street entry in the second interim data base, thereby creating a twice-translated address entry, as indicated by block 150. If the street entry is not extant as a street name entry in the street name data set, method 100 proceeds from query block 154 via a NO response line 160 and the extant street entry is discarded, as indicated by a block 162.

Method 100 continues with storing the postal street name or the listed street name in the street address data set as a respective twice-translated data entry in the second interim data base, as indicated by a block 158. Method 100 then inquires whether the just-treated street entry is the last street entry in the first interim data base, as indicated by a query block 164. If the just-treated street entry is not the last street entry in the first interim data base, method 100 proceeds from query block 164 via a NO response line 166 and selects a next street entry, as indicated by a block 168. Method 100 proceeds from block 168 to a locus 169 and proceeds from locus 169 to repeat steps described in connection with blocks 146, 150, 123, 154, 158, 162, 164 with regard to the next-selected street entry.

If the just-treated street entry is the last street entry in the first interim data base, method 100 proceeds from query block 164 via a YES response line 170 to treat the twice-translated address entries in the second interim data base with a geocoder routine to create geocoded address entries in a geocoded data set, as indicated by a block 172.

Method 100 continues by situating the geocoded data set in a spatial layer, as indicated by a block 174. Method 100 continues by orienting the spatial layer with respect to known loci in the spatial layer base map, as indicated by a block 176, thereby creating the spatial street address data set. Method 100 terminates at an END locus 178.

Figure 3:
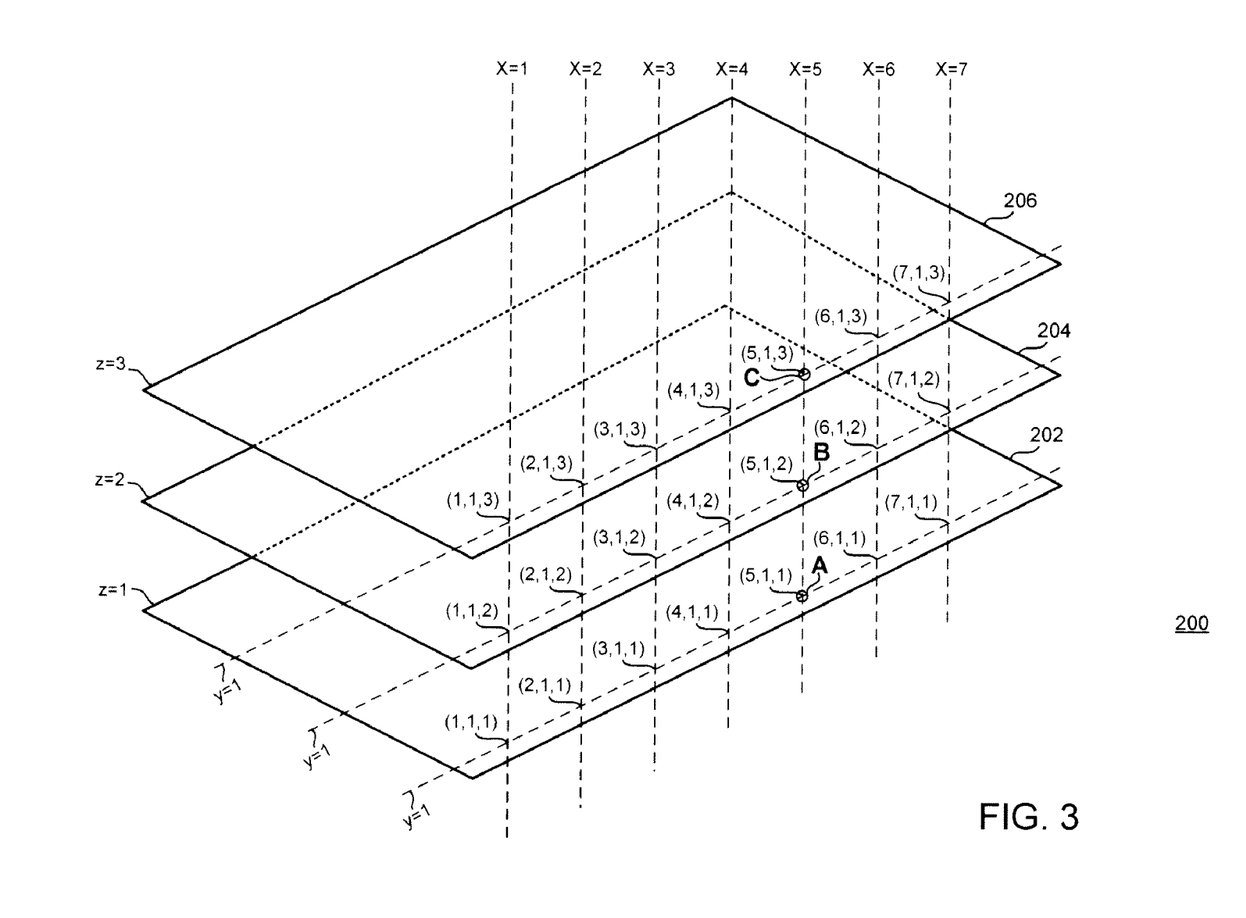
FIG. 3 is a schematic diagram illustrating orienting a spatial layer with known loci in a spatial layer base map.

FIG. 3 is a schematic diagram illustrating orienting a spatial layer with known loci in a spatial layer base map. In FIG. 3, a multi-layer spatial street address data set 200 includes layers 202, 204, 206. For simplicity of explanation, layers 202, 204, 206 are substantially planar, substantially rectangular and arranged in a substantially parallel orientation. More than three layers may be employed in a multi-layer spatial street address data set such as data set 200. It is not required that layers be planar, rectangular or parallel.

A Y-orienting plane y=1 is illustrated oriented substantially perpendicular with layers 202, 204, 206. Y-orienting plane y=1 is indicated by its respective intersections with layers 202, 204, 206. Other y-orienting planes may also be provided but are omitted from FIG. 2 to facilitate simplicity and understanding.

A plurality of X-orienting planes x=1, x=2, x=3, x=4m x=5, x=6, x=7 is illustrated oriented substantially perpendicular with Y-orienting plane y=1 and substantially perpendicular with layers 202, 204, 206. It is not required that X-orienting planes be perpendicular with Y-orienting planes or layers 202, 204, 206. In the representative arrangement illustrated in FIG. 2, layers 202, 204, 206, Y-orienting planes and X-orienting planes cooperate to establish a three-axis (x, y, z) orthogonal grid array of reference points familiar with one skilled in the art of structural design or solid geometry. Using such a grid array one may arrange loci in various layers to present a substantially aligned orientation with respect to at least one of the axes.

A locus A may be aligned with loci B, C so that each locus lies substantially along a common X axis so that locus A is situated at (x, y, z) coordinates (5, 1, 1), locus B is situated at (x, y, z) coordinates (5, 1, 2) and locus C is situated at (x, y, z) coordinates (5, 1, 3). By using such a common axis orientation one may carry out the step represented by block 176 (FIG. 2): adjust points in a spatial layer (e.g., layer 204 or layer 206) to align with known loci in a base map layer (e.g., layer 202).

Figure 4:
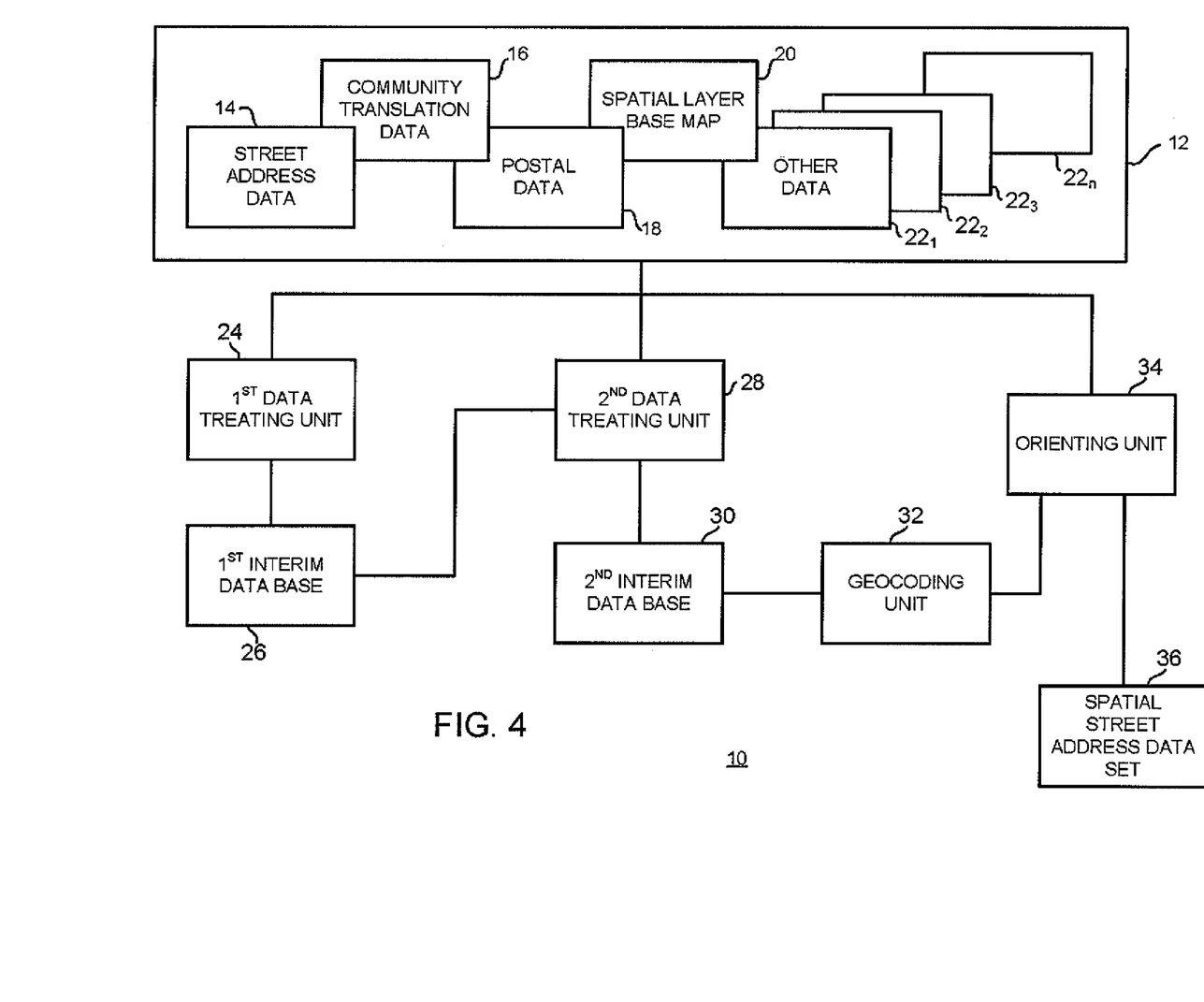
FIG. 4 is a schematic diagram of an apparatus for establishing a spatial street address data set.

FIG. 4 is a schematic diagram of an apparatus for establishing a spatial street address data set. In FIG. 4, an apparatus 10 includes a storage unit 12. Storage unit 12 may contain street address data 14, community translation data 16, postal data 18, a spatial layer base map 20 and other data sets $22_1$, $22_2$, $22_3$, $22_n$. The indicator "n" is employed to signify that there can be any number of other data sets stored in storage unit 12. The inclusion of four other data sets $22_1$, $22_2$, $22_3$, $22_n$ in FIG. 4 is illustrative only and does not constitute any limitation regarding the number of other data sets that may be included in the storage unit of the present invention.

A first data treating unit 24 is coupled with storage unit 12 for obtaining data from storage unit 12 for treating. A first interim data base 26 is coupled with first data treating unit 24 for receiving treated data from first data treating unit 24. A second data treating unit 28 is coupled with storage unit 12 for obtaining data from storage unit 12 for treating. Second data treating unit 28 is also coupled with first interim data base 26 for receiving data from first interim data base 26 for treating. A second interim data base 30 is coupled with second data treating unit 28 for receiving treated data from second data treating unit 28.

First data treating unit 24 may, by way of example and not by way of limitation, populate first interim data base 26 with a plurality of once-translated address entries. Each respective once-translated address entry may relate to a selected community entry from the street address data set 14 or relate to a selected community entry from community translation data set 16.

Second data treating unit 28 may, by way of example and not by way of limitation, populate second interim data base 30 with a plurality of twice-translated address entries. Each respective twice-translated address entry may relate to a selected street name entry from postal data set 18 or may relate to a selected street name entry from the street address data set 14.

Alternatively, each respective once-translated address entry in first interim data base 26 may relate to a selected street name entry from postal data set 18 or may relate to a selected street name entry from the street address data set 14. In such an alternate embodiment, each twice-translated address entry may relate to a selected community entry from the street address data set 14 or relate to a selected community entry from community translation data set 16.

A geocoding unit 32 is coupled with second interim data base 30. Geocoding unit 32 effects geocoding treatment of entries in the second interim data base 30 to populate a geocoded data set. An orienting unit 34 coupled with geocoding unit 32 effects orientation of entries in the geocoded data set in geocoding unit 32 with respect to known loci in spatial layer base map 20 to establish the spatial street address data set 36.

Street address data 14 may be embodied, by way of example and not by way of limitation, in an emergency service Master Street Address Guide (MSAG). Community translation data 16 may also be included, by way of example and not by way of limitation, in an MSAG. Postal data 18 may be embodied, by way of example and not by way of limitation, in a U.S. Postal Service (USPS) postal address data base.

It is to be understood that, while the detailed drawings and specific examples given describe embodiments of the invention, they are for the purpose of illustration only, that the method and apparatus of the invention are not limited to the precise details and conditions disclosed and that various changes may be made therein without departing from the spirit of the invention which is defined by the following claims:

The invention claimed is:

1. A method for establishing a spatial street address data set; the method comprising:
   (a) in no particular order:
      (1) providing a street address data set containing at least community entry and street name entry information;
      (2) providing a postal data set containing at least street name entry information;
      (3) providing a community translation data set containing at least community entry information; and
      (4) providing a spatial layer base map containing at least one spatial community entry;
   (b) employing selected information from said street address data set, said community translation data set and said spatial layer base map for establishing a first interim data base; said first interim data base containing a plurality of once-translated address entries; each respective once-translated address entry of said plurality of once-translated address entries replacing a respective spatial community entry of said at least one spatial community entry; each said respective once-translated address entry relating to a selected community entry from said street address data set or relating to a selected community entry from said community translation data set;
   (c) employing said first interim data base and selected information from said street address data set and said postal data set for establishing a second interim data base; said second interim data base containing a plurality of twice-translated address entries; each respective twice-translated address entry of said plurality of twice-translated address entries replacing a respective street name entry in said first interim data base; each said respective twice-translated address entry relating to a selected street name entry from said postal data set or relating to a selected street name entry from said street address data set;
   (d) treating said second interim data base with a geocoder routine to create geocoded address entries in a geocoded data set;
   (e) situating said geocoded data set in a spatial layer; and
   (f) orienting said spatial layer with respect to known loci in said spatial layer base map.

2. A method for establishing a spatial street address data set as recited in claim 1 wherein said establishing said first interim data base comprises:
   (b)(1) culling address information from said street address data set to establish a culled address set;
   (b)(2) selecting a community entry from said culled address set;
   (b)(3) inquiring whether said community entry is extant as a spatial community entry in said spatial layer base map;
   (b)(4) if said community entry is extant as a spatial community entry in said spatial layer base map, substituting said spatial community entry for said community entry in said first interim data base;
   (b)(5) if said community entry is not extant as a spatial community entry in said spatial layer base map, checking whether said community entry is extant as a translation community entry in said community translation data set;
   (b)(6) if said community entry is extant as a translation community entry in said community translation data set, substituting said translation community entry for said community entry in said first interim data base;
   (b)(7) storing said spatial community entry or said translation community entry as a respective said once-translated data entry in said first interim data base;
   (b)(8) if said community entry is not extant as a translation community entry in said community translation data set, discarding said community entry;
   (b)(9) repeating steps (b)(1) through (b)(8) for treating a next community entry in said culled address set until all community entries in said culled address set have been treated.

3. A method for establishing a spatial street address data set as recited in claim 1 wherein said establishing a second interim data base comprises:
   (c)(1) selecting a street entry from said first interim data base;
   (c)(2) seeking to effect translating said street entry into a postal street name in said postal data set;
   (c)(3) if said translating is achieved, substituting said postal street name for said street entry in said second interim data base;
   (c)(4) if said translating is not achieved, seeking to effect matching said street entry with a listed street name in said street address data set;
   (c)(5) if said matching is achieved, substituting said listed street name for said street entry in said second interim data base;
   (c)(6) storing said postal street name or said listed street name as a respective said twice-translated entry in said second interim data base;
   (c)(7) if said matching is not achieved, discarding said street entry;
   (c)(8) repeating steps (c)(1) through (c)(7) for treating a next street entry in said first interim data base until all street entries have been treated.

4. A method for establishing a spatial street address data set as recited in claim 2 wherein said establishing a second interim data base comprises:
   (c)(1) selecting a street entry from said first interim data base;
   (c)(2) seeking to effect translating said street entry into a postal street name in a postal data base;
   (c)(3) if said translating is achieved, substituting said postal street name for said street entry in said second interim data base;
   (c)(4) if said translating is not achieved, seeking to effect matching said street entry with a listed street name in said street address data set;
   (c)(5) if said matching is achieved, substituting said listed street name for said street entry in said second interim data base;
   (c)(6) storing said postal street name or said listed street name as a respective said twice-translated entry in said second interim data base;
   (c)(7) if said matching is not achieved, discarding said street entry;
   (c)(8) repeating steps (c)(1) through (c)(7) for treating a next street entry in said first interim data base until all street entries have been treated.

5. A method for establishing a spatial street address data set as recited in claim 1 wherein said street address data set is embodied in an emergency service master street address guide.

6. A method for establishing a spatial street address data set as recited in claim 1 wherein said postal data set is a U.S. Postal Service postal address data base.

7. A method for establishing a spatial street address data set as recited in claim 4 wherein said street address data set is embodied in an emergency service master street address guide.

8. A method for establishing a spatial street address data set as recited in claim 7 wherein said postal data set is a U.S. Postal Service postal address data base.

9. A method for establishing a spatial street address data set; the method comprising:
(a) in no particular order:
  (1) providing a first street address data set containing at least community entry and street name entry information;
  (2) providing a second street address data set containing at least street name entry information;
  (3) providing a community translation table containing at least community entry information; and
  (4) providing a spatial layer base map containing at least one spatial community entry;
(b) employing selected information from said first street address data set, said community translation table and said spatial layer base map for establishing a first interim data base; said first interim data base containing a plurality of once-translated address entries; each respective once-translated address entry of said plurality of once-translated address entries replacing a respective spatial community entry of said at least one spatial community entry; each said respective once-translated address entry relating to a selected community entry from said first street address data set or relating to a selected community, entry from said community translation table;
(c) employing said first interim data base and selected information from said first street address data set and said second street address data set for establishing a second interim data base; said second interim data base containing a plurality of twice-translated address entries; each respective twice-translated address entry of said plurality of twice-translated address entries replacing a respective street name entry in said first interim data base; each said respective twice-translated address entry relating to a selected street name entry from said first street address data set or relating to a selected street name entry from said second street address data set;
(d) treating said second interim data base with a geocoder routine to create geocoded address entries in a geocoded data set;
(e) situating said geocoded data set in a spatial layer; and
(f) orienting said spatial layer with respect to known loci in said spatial layer base map.

10. A method for establishing a spatial street address data set as recited in claim 9 wherein said establishing said second interim data base comprises:
(b)(1) culling address information from said first street address data set to establish a culled address set;
(b)(2) selecting a community entry from said culled address set;
(b)(3) inquiring whether said community entry is extant as a spatial community entry in said spatial layer base map;
(b)(4) if said community entry is extant as a spatial community entry in said spatial layer base map, substituting said spatial community entry for said community entry in said first interim data base;
(b)(5) if said community entry is not extant as a spatial community entry in said spatial layer base map, checking whether said community entry is extant as a translation community entry in said community translation table;
(b)(6) if said community entry is extant as a translation community entry in said community translation able, substituting said translation community entry for said community entry in said first interim data base;
(b)(7) storing said spatial community entry or said translation community entry as a respective said once-translated data entry in said first interim data base;
(b)(8) if said community entry is not extant as a translation community entry in said community translation table, discarding said community entry;
(b)(9) repeating steps (b)(1) through (b)(8) for treating a next community entry in said culled address set until all community entries in said culled address set have been treated.

11. A method for establishing a spatial street address data set as recited in claim 9 wherein said establishing a first interim data base comprises:
(c)(1) selecting a street entry from said first interim data base;
(c)(2) seeking to effect translating said street entry into a postal street name in said second street address data set;
(c)(3) if said translating is achieved, substituting said postal street name for said street entry in said second interim data base;
(c)(4) if said translating is not achieved, seeking to effect matching said street entry with a listed street name in said first street address data set;
(c)(5) if said matching is achieved, substituting said listed street name for said street entry in said second interim data base;
(c)(6) storing said postal street name or said listed street name as a respective said twice-translated entry in said second interim data base;
(c)(7) if said matching is not achieved, discarding said street entry;
(c)(8) repeating steps (c)(1) through (c)(7) for treating a next street entry in said first interim data base until all street entries have been treated.

12. A method for establishing a spatial street address data set as recited in claim 10 wherein said establishing a first interim data base comprises:
(c)(1) selecting a street entry from said first interim data base;
(c)(2) seeking to effect translating said street entry into a postal street name in said second street address data set;
(c)(3) if said translating is achieved, substituting said postal street name for said street entry in said second interim data base;
(c)(4) if said translating is not achieved, seeking to effect matching said street entry with a listed street name in said first street address data set;
(c)(5) if said matching is achieved, substituting said listed street name for said street entry in said second interim data base;
(c)(6) storing said postal street name or said listed street name as a respective said twice-translated entry in said second interim data base;
(c)(7) if said matching is not achieved, discarding said street entry;
(c)(8) repeating steps (c)(1) through (c)(7) for treating a next street entry in said first interim data base until all street entries have been treated.

13. A method for establishing a spatial street address data set as recited in claim 9 wherein said first street address data set is embodied in an emergency service master street address guide.

14. A method for establishing a spatial street address data set as recited in claim 9 wherein said second street address data set is a U.S. Postal Service postal address data base.

15. A method for establishing a spatial street address data set as recited in claim 12 wherein said first street address data set is embodied in an emergency service master street address guide.

16. A method for establishing a spatial street address data set as recited in claim 15 wherein said second street address data set is a U.S. Postal Service postal address data base.

17. An apparatus for establishing a spatial street address data set;
the apparatus comprising:
- (a) at least one computer-readable storage media; said at least one computer-readable storage media containing:
  - (1) a street address data set containing at least community entry and street name entry information;
  - (2) a postal data set containing at least street name entry information;
  - (3) a community translation data set containing at least community entry information; and
  - (4) a spatial layer base map containing at least one spatial community entry;
- (b) a first data treating unit coupled with said at least one computer-readable storage media; said first data treating unit employing selected information from said street address data set, said community translation data set and said spatial layer base map for establishing a first interim data base containing a plurality of once-translated address entries; each respective once-translated address entry of said plurality of once-translated address entries replacing a respective spatial community entry of said at least one spatial community entry; each said respective once-translated address entry relating to a selected community entry from said street address data set or relating to a selected community entry from said community translation data set;
- (c) a second data treating unit coupled with said first interim data base and with said at least one computer-readable storage media; said second data treating unit employing selected information from said street address data set and said postal data set for establishing a second interim data base containing a plurality of twice-translated address entries; each respective twice-translated address entry of said plurality of twice-translated address entries replacing a respective street name entry in said first interim data base; each said twice-translated address entry relating to a selected street name entry from said postal data set or relating to a selected street name entry from said street address data set;
- (d) a geocoding unit coupled with said second interim data base; said geocoding unit effecting geocoding treatment of entries in said second interim data base to populate a geocoded data set; and
- (e) an orienting unit coupled with said geocoding unit; said orienting unit effecting orientation of entries in said geo coded data set with respect to known loci in said spatial layer base map to establish said spatial street address data set.

18. An apparatus for establishing a spatial street address data set as recited in claim 17 wherein said first street address data set is embodied in an emergency service master street address guide.

19. An apparatus for establishing a spatial street address data set as recited in claim 17 wherein said second street address data set is a U.S. Postal Service postal address data base.

20. An apparatus for establishing a spatial street address data set as recited in claim 19 wherein said first street address data set is embodied in an emergency service master street address guide.

\* \* \* \* \*